Figure 1:
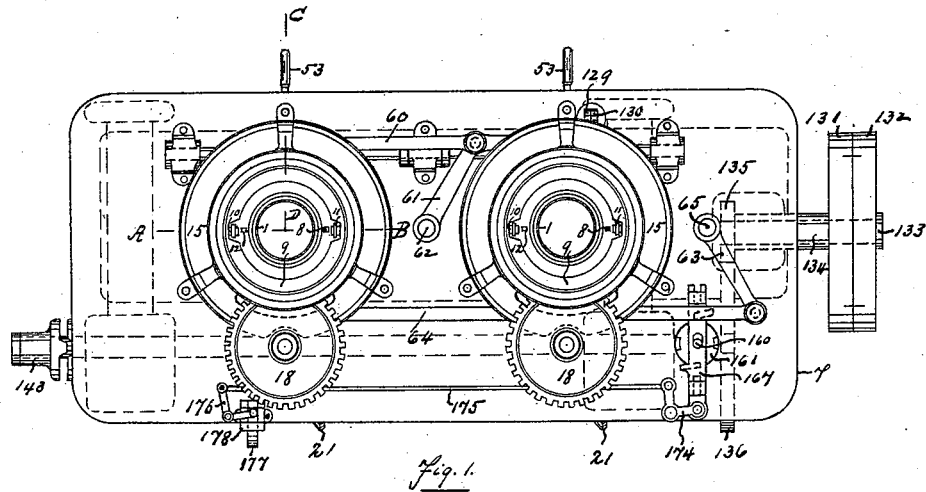

(No Model.) 7 Sheets—Sheet 1.

A. T. & W. L. CATHCART.
CIRCULAR KNITTING MACHINE.

No. 472,029. Patented Apr. 5, 1892.

WITNESSES:
Robert Wallace,
A. H. Morrison

INVENTORS,
Alexander T. Cathcart
William L. Cathcart

BY
Macleod, Calver and Randall.
ATTORNEYS

THE NORRIS PETERS CO., PHOTO-LITHO., WASHINGTON, D. C.

(No Model.)
7 Sheets—Sheet 2.
A. T. & W. L. CATHCART.
CIRCULAR KNITTING MACHINE.
No. 472,029.
Patented Apr. 5, 1892.
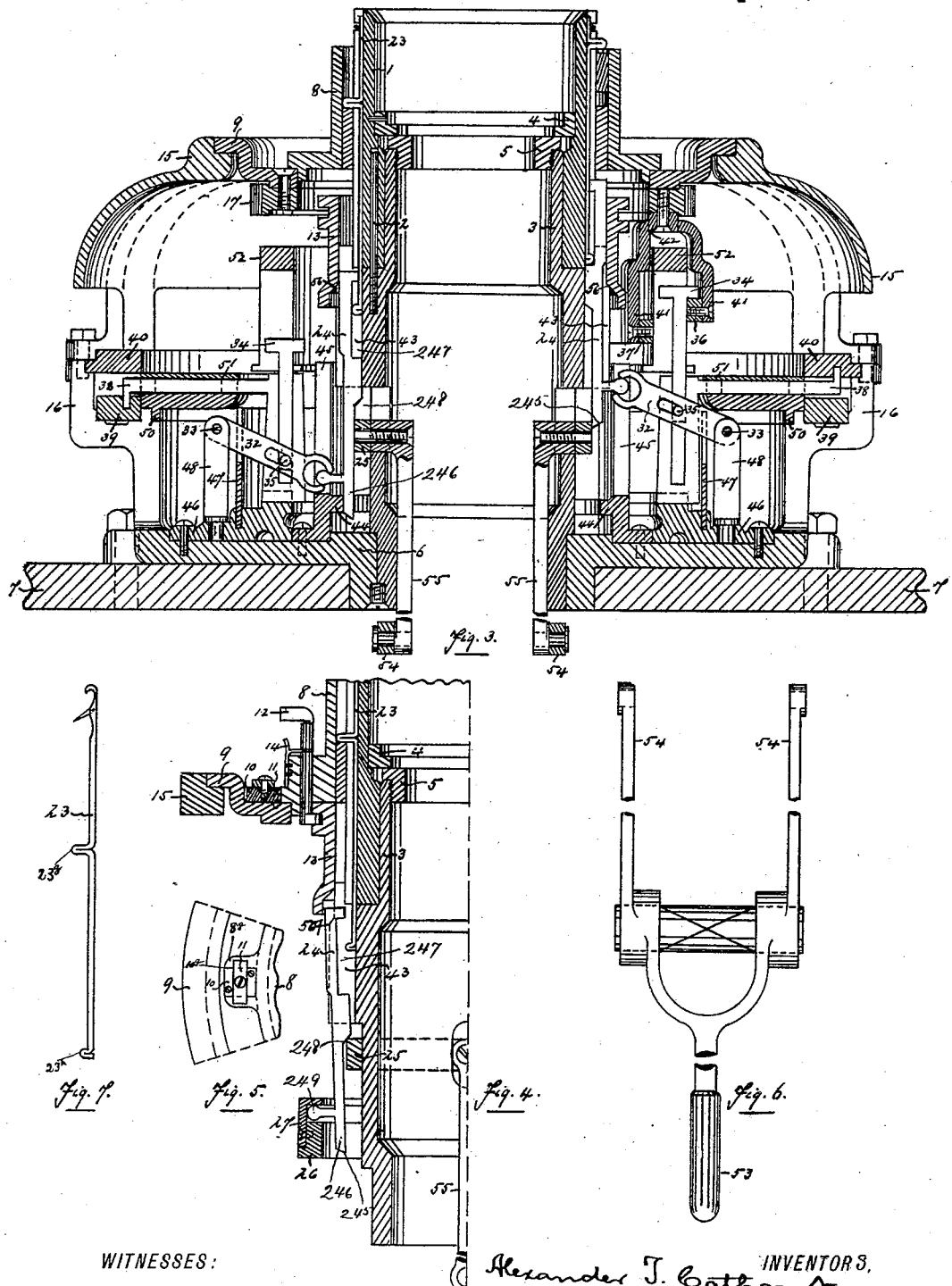
WITNESSES:
Robert Wallace.
A. H. Morrison.
INVENTORS,
Alexander T. Cathcart
William L. Cathcart
BY Macleod, Calver and Randall
ATTORNEYS.

(No Model.) 7 Sheets—Sheet 3.

A. T. & W. L. CATHCART.
CIRCULAR KNITTING MACHINE.

No. 472,029. Patented Apr. 5, 1892.

WITNESSES:
Robert Wallace.
A. H. Morrison.

INVENTORS,
Alexander T. Cathcart
William L. Cathcart
BY
Macleod, Calver & Randall
ATTORNEYS.

THE NORRIS PETERS CO., PHOTO-LITHO., WASHINGTON, D. C.

(No Model.) 7 Sheets—Sheet 4.
A. T. & W. L. CATHCART.
CIRCULAR KNITTING MACHINE.
No. 472,029. Patented Apr. 5, 1892.
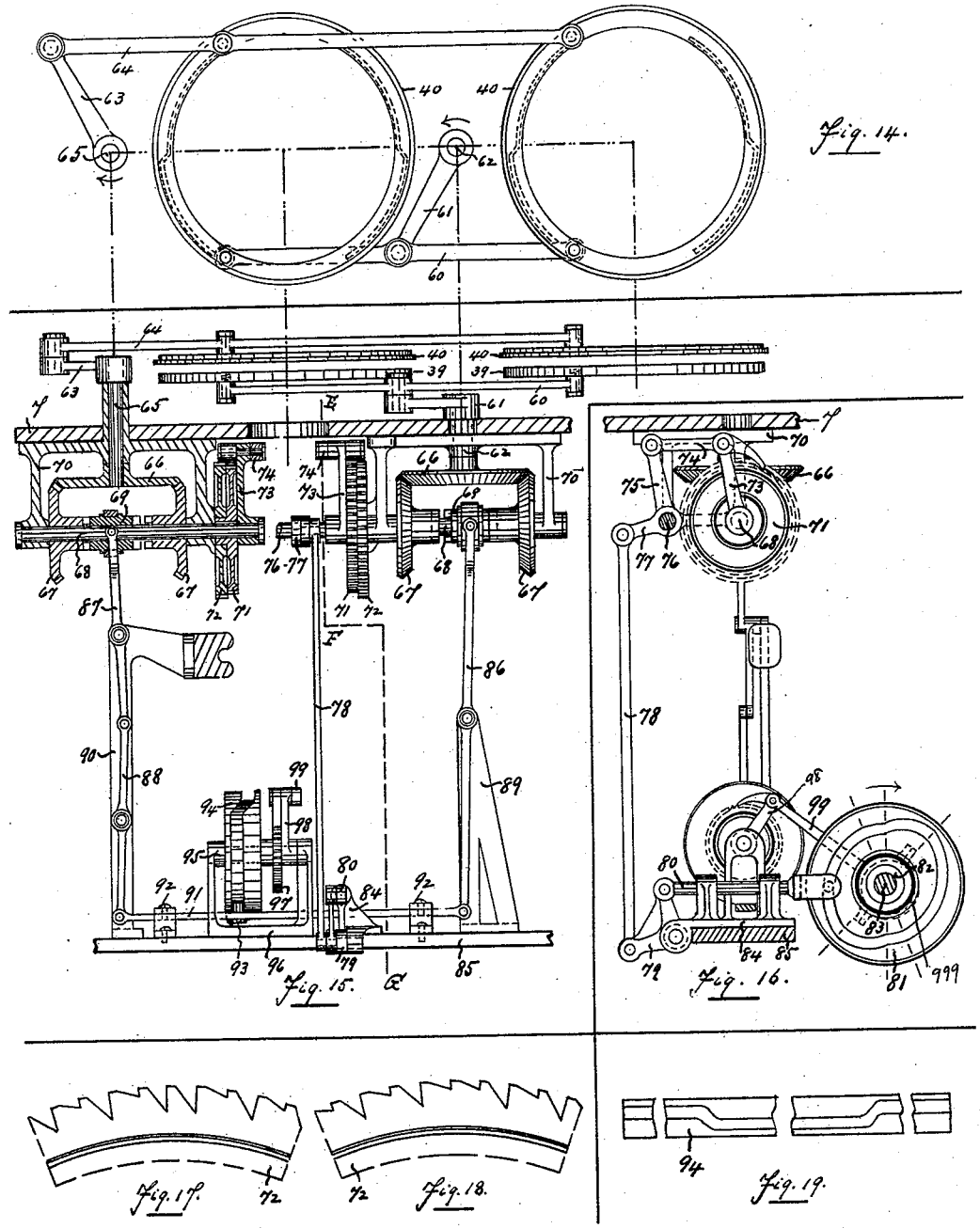
WITNESSES:
Robert Wallace.
A. H. Morrison.
INVENTORS,
Alexander T. Cathcart
William L. Cathcart
BY
Macleod, Calver & Randall
ATTORNEYS.

(No Model.)  7 Sheets—Sheet 5.
A. T. & W. L. CATHCART.
CIRCULAR KNITTING MACHINE.
No. 472,029.  Patented Apr. 5, 1892.
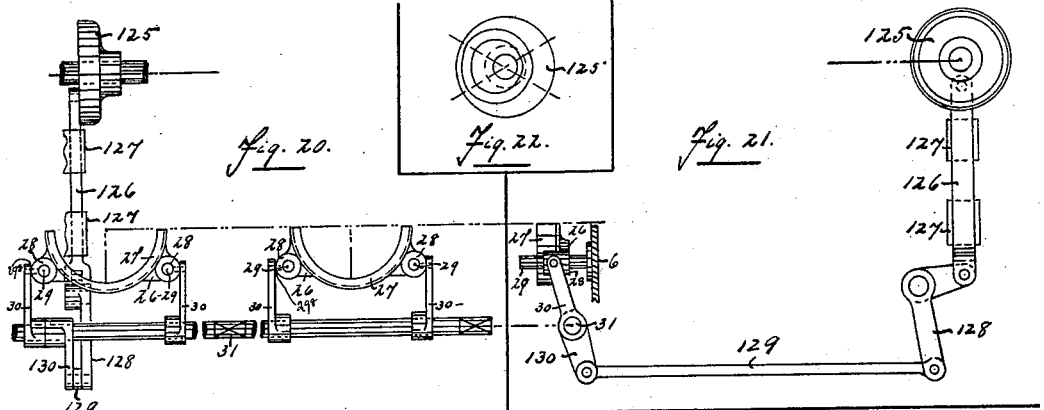
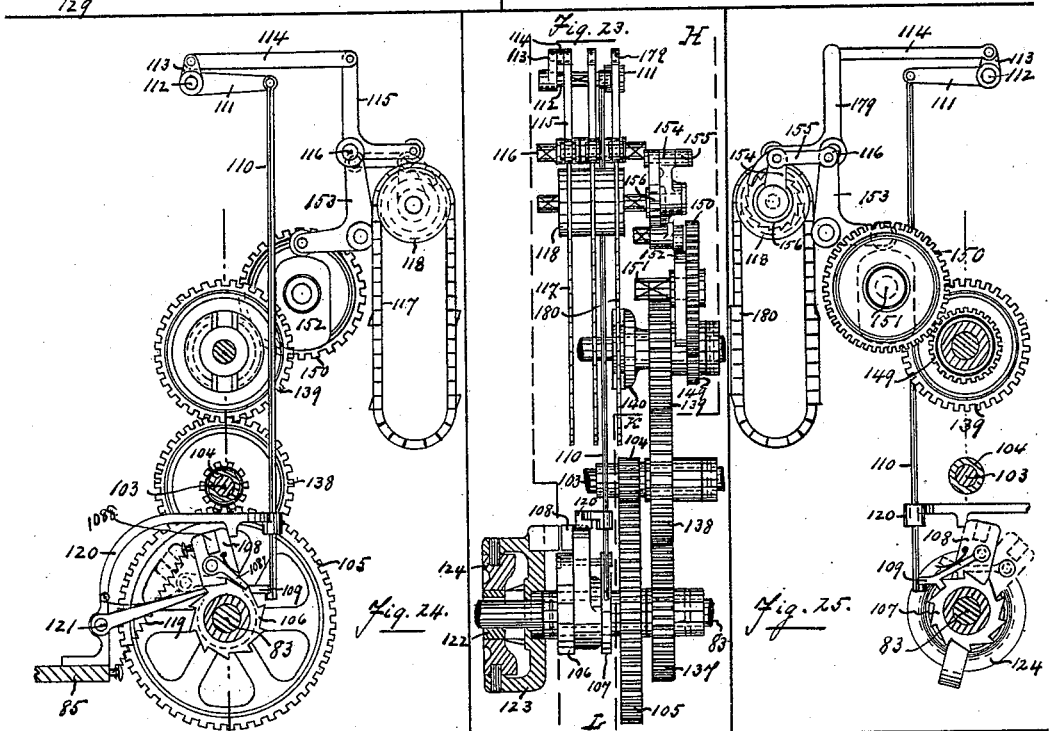
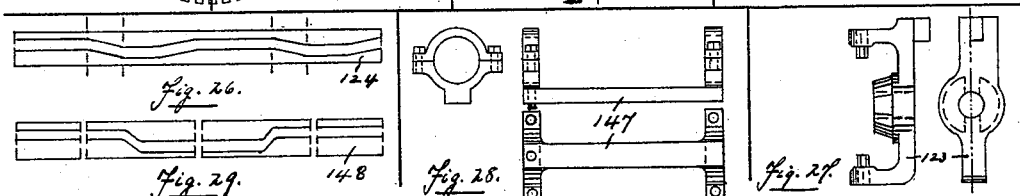
WITNESSES:  INVENTORS
Robert Wallace.  Alexander T. Cathcart
A. H. Morrison  William L. Cathcart
   BY
   Macleod, Calver & Randall
   ATTORNEYS.

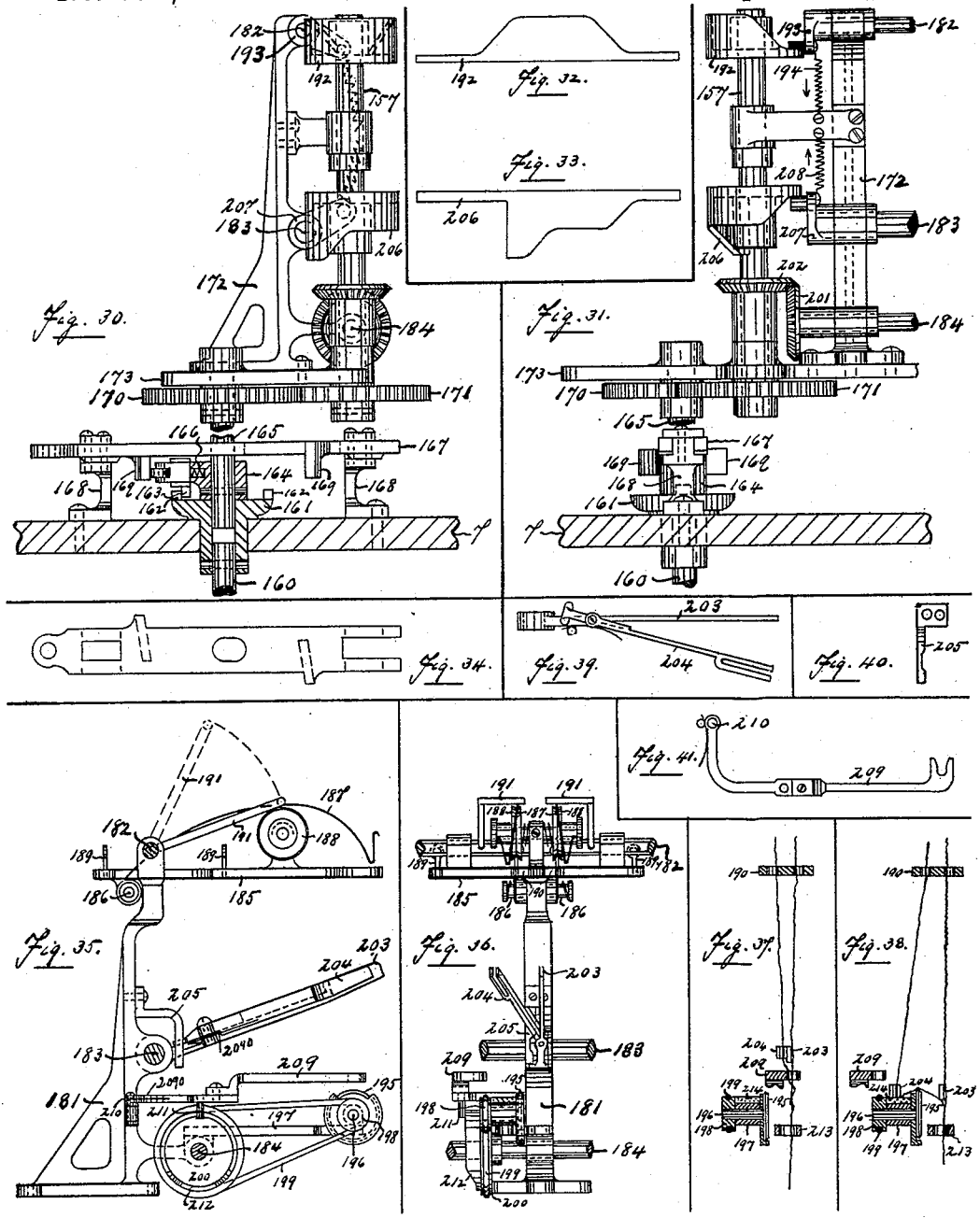

(No Model.)  A. T. & W. L. CATHCART.  7 Sheets—Sheet 7.
CIRCULAR KNITTING MACHINE.

No. 472,029.  Patented Apr. 5, 1892.

WITNESSES:
Robert Wallace,
A. H. Morrison.

INVENTORS,
Alexander T. Cathcart
William L. Cathcart
BY
Macleod, Calver & Randall
ATTORNEYS.

UNITED STATES PATENT OFFICE.

ALEXANDER T. CATHCART AND WILLIAM L. CATHCART, OF GWYNEDD, PENNSYLVANIA.

CIRCULAR-KNITTING MACHINE.

SPECIFICATION forming part of Letters Patent No. 472,029, dated April 5, 1892.

Application filed July 13, 1891. Serial No. 399,367. (No model.)

*To all whom it may concern:*

Be it known that we, ALEXANDER T. CATHCART and WILLIAM L. CATHCART, citizens of the United States, residing at Gwynedd, in the county of Montgomery and State of Pennsylvania, have invented certain new and useful Improvements in Circular-Knitting Machines, of which the following is a specification, reference being had therein to the accompanying drawings.

This invention relates to circular-knitting machines such as are employed for the knitting of stockings. In such machines the needles of a machine usually rest in and are guided by the external axial groove of a stationary needle-cylinder, about which a cylindrical cam-bearing band or cylinder turns, the cam-cylinder being caused to revolve about the needle-cylinder continuously in one direction during tubular knitting, as in the process of forming the leg portion of a stocking or the foot portion thereof, and to reciprocate about said needle-cylinder during pouch-knitting, as in the process of forming a heel or toe. The heel or toe pouches usually are thickened, and usually in the knitting of so-called "seamless stockings" are formed by throwing out of action en masse a number of the needles around the needle-cylinder—ordinarily about one-half thereof—and then reciprocating the cam-cylinder to knit upon the remaining needles left in action, the number in action being lessened gradually one needle per knitted course by rendering inoperative the last needle of the active set alternately at each end of the said set until only about one-sixth of the total number of needles in the machine remain in action, after which the needles which were successively thrown out of action are successively restored to action, but in an inverse order. When all are restored, the pouch is complete, whereupon the half of the needles which were thrown out of action en masse are returned to action en masse and tubular knitting is resumed.

Machines have been devised heretofore which have been fitted to perform automatically the operations requisite in pouch-knitting, and also to change automatically from tubular knitting to pouch-knitting, and vice versa, as required in the knitting of stockings. Our present invention is an improvement on machines of this class—that is, the class of so-called "automatic" machines—and the nature and features thereof will first be described with reference to the accompanying drawings, and then will be particularly pointed out in the claims at the close of this specification.

Figure 2:
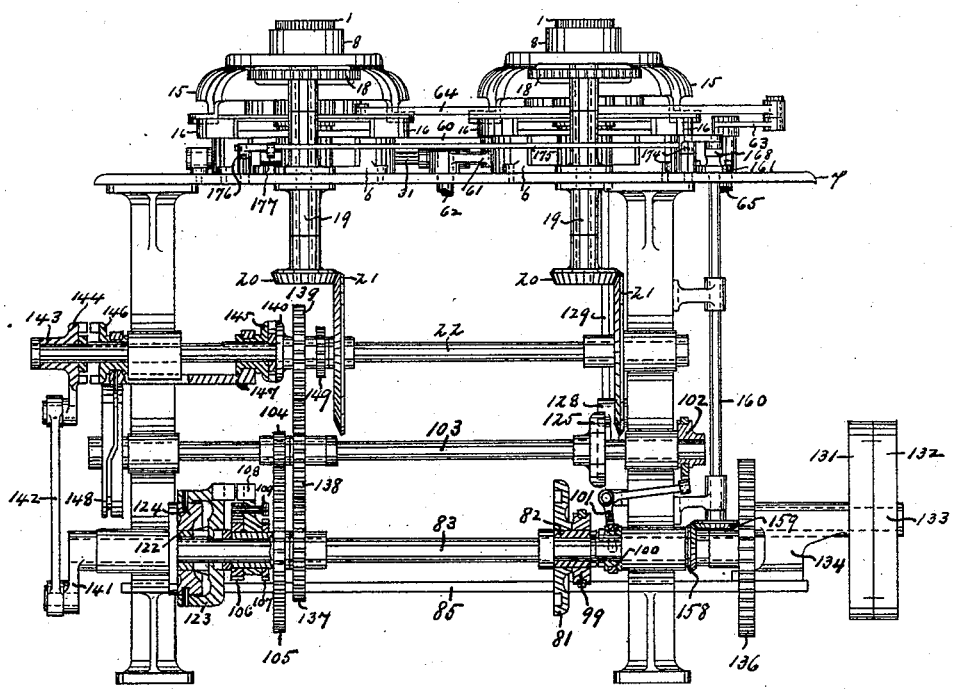
Figure 8:
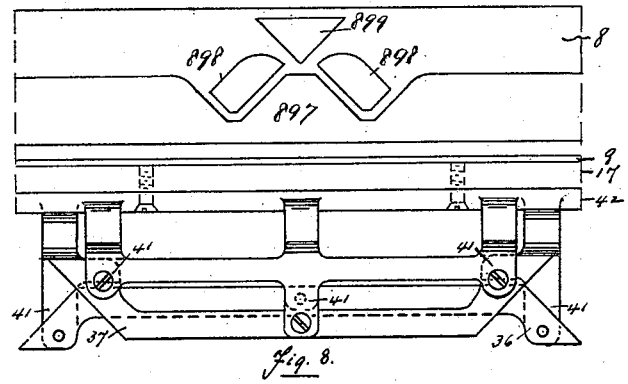
Figure 9:
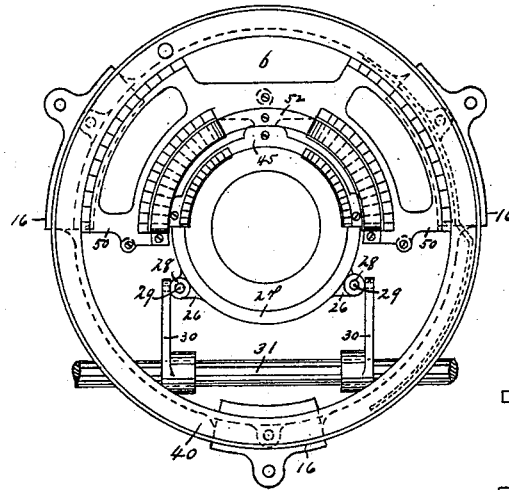
Figure 11:
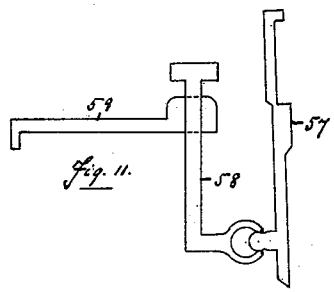
Figure 10:
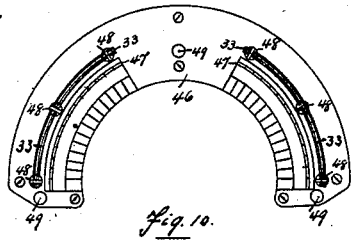
Figure 12:
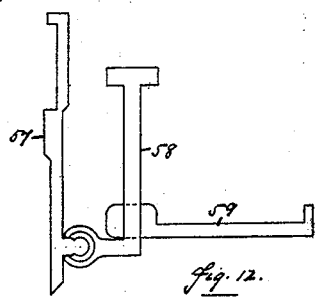
Figure 13:
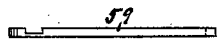
Figure 42:
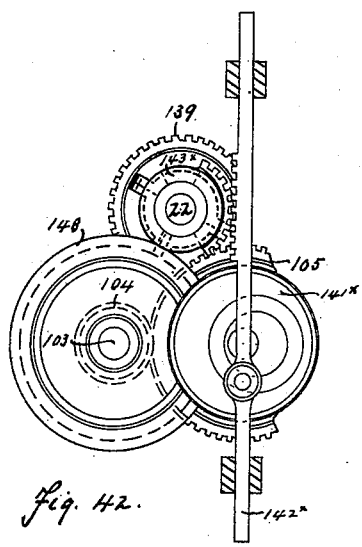
Figure 43:
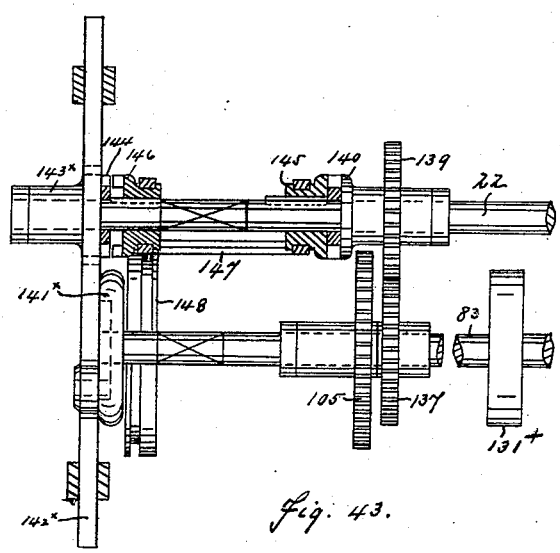
Figure 44:
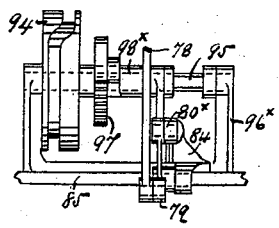
Figure 45:
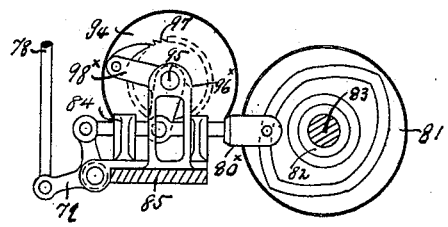

In the drawings, Figure 1 is a plan view of a machine embodying our invention; and Fig. 2 is a view thereof in rear elevation, partly in section. From both of these views in order to secure clearness there have been omitted a number of details not necessarily involved by the invention and also the greater part of the pattern and other controlling mechanism. In both of these views, moreover, the machine is illustrated as embodying two knitting-cylinders with their adjuncts in a single framing, both being operated by a single motor, this being an arrangement which is desirable for economy in construction and to a certain extent in operation. Fig. 3 is a view in section on the line A B, Fig. 1, of a needle-cylinder and adjacent parts, the cam-cylinder in this figure being turned ninety degrees to the rear from the position in which it is represented in Fig. 1. Fig. 4 is a view in section on the line C D, Fig. 1, the cam-cylinder being in the relative position in which it is represented in Fig. 3. Fig. 5 is a top plan of a portion of the cam-cylinder and its supporting ring or flange, showing the manner of connecting and securing the former to the latter. Fig. 6 is a top plan of the double-cranked lever for lifting the ejecting-ring and disconnecting the jacks from the needles. Fig. 7 is a view in side elevation of one of the needles employed. Fig. 8 is an internal development of a portion of the cam-cylinder and its supporting flange or ring and driving-gear, showing the knitting-cams and the fashioning-cams. Fig. 9 is a top plan of a cylinder bed-plate with the indicating-cams and all parts secured to said plate, excepting the globular cap which supports the cam-cylinder and the lower horizontal guide-plate and supporting-cylinder. Fig. 10 is a top plan of the lower horizontal guide-plate. Fig. 11 is a view in side elevation of a modification of the devices for actuating the jacks in fashioning, showing one of the jacks lowered and in the backward position it assumes when disengaged from a needle. Fig. 12 is a similar view thereof, taken from the opposite side of the devices, showing the jack raised and in the forward position in which it engages with a needle. Fig. 13 is a top plan of the horizontal slide employed in this modification. Fig. 14 is a top plan of the indicating-cams for both cylinders and such of their operating mechanism as is above the table. Fig. 15 is a view in front elevation, partly sectional, of the parts shown in Fig. 14 with, in addition, such portions of the actuating and controlling mechanism for the indicating-cams as are not in the main shafting. Fig. 16 is a view in section on line E F G of Fig. 15, looking from the right-hand side in the latter figures and showing, in addition to what is in the same, the portions of the actuating mechanism which are on the main shafting. Figs. 17 and 18 are side elevations of segments one hundred and eighty degrees apart of one of the masked ratchets which form a part of the mechanism for actuating the indicating-cams. Fig. 19 is a development of the cam employed for shifting the clutches of the indicating mechanism. Fig. 20 is a top plan of the mechanism for reciprocating the jack-holders of both cylinders. Fig. 21 is a right-hand (from the front) side elevation, partly sectional, of the mechanism shown in Fig. 20, the parts being shown turned to one side in order to get them within proper limits on the sheet of drawings. Fig. 22 is a left-hand (from the front) side elevation of the cam for reciprocating the jack-holders. Fig. 23 is a rear elevation, part sectional, of the pattern-chain mechanism and the mechanism for driving the change-shaft, all bearings being, for clearness, omitted. Fig. 24 is a left-hand (from the rear) side elevation, partly sectional, of the mechanism shown in Fig. 23. Fig. 25 is a right-hand (from the rear) side elevation of a section on the line H K L, Fig. 23. Fig. 26 is a development of the cam which forms a part of the change-shaft mechanism. Fig. 27 shows in front and side elevation the lug-crank which drives the change-shaft. Fig. 28 shows in end and side elevation and in bottom plan the cam-bar which shifts the main rotary and reciprocating clutches. Fig. 29 is a development of the cam which engages the cam-bar shown in Fig. 28. Figs. 30 and 31 are respectively left-hand side (from the front) and front elevations (both partly in section) of portions of the thread-inserting and take-up mechanism. Fig. 32 is a development of the take-up cam. Fig. 33 is a development of the cam for oscillating vertically the parting-bar. Fig. 34 is a top plan of the cam-slide, which, actuated by a pattern-chain, indicates the beginning and causes the ending of the motion of the inserting and take-up mechanism. Figs. 35 and 36 are respectively left-hand (from the front) side and front elevations of the take-up and thread-inserting mechanism which are employed for each needle-cylinder. Figs. 37 and 38 are sectional views of parts of the inserting mechanism, illustrating the action of the latter. Fig. 39 is a top plan of the parting-bar. Fig. 40 is a front elevation of the cam for vibrating sidewise one section of the parting-bar. Fig. 41 is a top plan of the inserting-lever. Figs. 42 and 43 are respectively a left hand (from the rear) end elevation and a rear elevation, partly sectional, of a modification of the mechanism for rotating or for reciprocating the cam-cylinders. Figs. 44 and 45 are respectively a front elevation and a right-hand (from the front) elevation, partly sectional, of a modification of the mechanism for actuating cam 94.

Throughout the drawings the same reference-numbers designate the same parts.

Since the mechanism immediately surrounding the needle-cylinders is similar each to each, we will describe that of one only, the connections between each cylinder and the motive mechanism being specified in the description of the latter.

The needle-cylinder 1, Fig. 3, is of the ordinary vertical type, excepting that it is thickened internally at the bottom to give metal for the socket of a pin 2, screwed into the supporting-cylinder 3, which cylinder the needle-cylinder encircles for a portion of its length. To make the needle-cylinder removable, said cylinder has an accurate, though not a driving, fit on the pin 2 and cylinder 3, the two latter of which co-operate to fix the position radially and circumferentially of the needle-cylinder and in operation to prevent motion of the said cylinder. To the latter cylinder, at a point about midway of its inner length, there is secured the flange 4, which supports the weight of said cylinder and rests on the flange 5, threaded to the top of the cylinder 3. It will be seen that by turning the flange 5 the height of the needle-cylinder will be altered, and since that of the cam-cylinder is always the same there will be a consequent variation in the length of the stitch. The supporting-cylinder is secured by screws to the bed-plate 6, which is firmly bolted to the table 7.

The cam-cylinder 8, Figs. 3 and 8, in regard to the arrangement of its cams 897 898 899 may be of any of those forms in which the needles are made inoperative by raising their knitting-butts above said cams. It carries a yarn-guide (not shown) of ordinary form, and has horizontal and vertical flanges which fit and the former of which rests on the annular flange 9. On the latter flange are bolted lugs 10 10, Figs. 4 and 5, which fit corresponding slots $10^s$ in projections $8^s$ from the cam-cylinder and by which the latter is driven. To each lug $8^s$ is screwed a retaining-plate 11, which lies above the forks of the slot and prevents vertical movement of the cam-cylinder. The flange 9 is supported by and moves in a circular recess formed in the top of the globular cap 15, the latter at its base being formed into a tripod, which is bolted to lugs on curved projections 16 16 16, Fig. 9, from bedplate 6. To the base of flange 9, extending upward, is bolted the annular gear 17, which meshes with spur-gear 18, Figs. 1 and 2, keyed to spindle 19, the latter also having keyed thereto bevel-gear 20, which engages with a bevel-gear 21, keyed to shaft 22, the said shaft being either rotated or oscillated by mechanism to be hereinafter described.

The form of the needles 23 is shown in Fig. 7. Each needle has an upper or knitting butt $23^g$ and a lower butt $23^h$ for engagement with its jack 24. The needles are for convenience similar throughout the cylinder, although those which knit the shortest course of the pouch have no jacks and require no lower butts. All of the needles, except those specified, are provided with jacks of similar form. Each jack has an upper interior space 247, in which the lower butt $23^h$ of the needle reciprocates in knitting. Each jack is sloped in and cut away on its lower inner side to form an inclined or cam surface 248 for the ejecting-ring 25, and has an outturned butt 249 near its lower end for use in reciprocating vertically the jack in moving its engaged needle above the knitting-cams or downward within range of the said cams, and below the butt has a guiding-extension 246, with its end 245 inclined upward and outward to insure that the jack shall be vertical when at the lower limit of its stroke. The butts of the jacks of that portion of the needle which is thrown out of and into operation *en masse* are engaged by a jack-holder, Figs. 4, 9, 20, and 21, which is similar in formation to that described in United States Patents Nos. 395,214 and 410,071, to which reference may be had. The present jack-holder consists of a semi-annular frame 26, on which the butts 249 rest and pivot, the latter being retained in position by a vertical cap 27, which is flanged inwardly above them at such a height as to permit pivotal motion of the jacks and secured to frame 26. On the frame 26 are cast cylindrical guideways 28 28, which are reciprocated on standards 29 29, secured to bed-plate 6. Pins $29^g$, projecting from the guideways, engage oblong slots in the cranks 30 30, fixed to shaft 31. The said shaft 31 is oscillated for the purpose of effecting the reciprocation of the jacks and their engaged needles by means which will be hereinafter described.

The mechanism for raising above the knitting-cams or lowering within range of said cams the needles by which narrowing and widening are effected, and which we designate herein as "fashioning-needles," is as follows: The butt 249 of the jack 24 of each fashioning-needle is engaged by a lever 32, pivoted at its outer end on a wire 33, bent in circular form. The said lever is forked at its inner end for pivotally grasping the rounded butt 249 of the jack and has near its center an oblong slot, by which it engages a pin 35, fixed to and projecting from a vertical slide 34. Slide 34 has a T-head, which makes it capable of engagement with either of the fashioning-cams 36 and 37, Figs. 3 and 8, by which it (the connected lever-jack) and the needle are raised or lowered. The said cams 36 and 37 are attached to and moved with the cam-cylinder and have such a radial distance between them as is just sufficient to keep slide 34 out of engagement with one cam when it is in range of the other. Slide 34 is movable radially into engagement with either fashioning-cam through the horizontal slide 38, which has a pin at its outer end for engaging the indicating-cam 39 or 40 which moves it. In the case of the left-hand slides the pins thereof are turned downward and engage cam 39, and the pins of the slides on the right are turned upward and engage a similar but inverted cam 40. Each slide 38 has a downward U-shaped extension on its inner extremity, the said extension having a recess which engages and guides its slide 34.

The fashioning-cams 36 and 37 are portions of cylindrical surfaces, the former thereof having a flat top and ends equally inclined downward, while the latter has a flat bottom and ends equally inclined upward. The said cams are bolted to internal and external projections 41 41 from a partially-cylindrical band 42, which is rigidly secured to the annular gear 17, and hence connected to the cam-cylinder, with whose motion therefore the motion of these cams at all times coincides. The latter are preferably so set that their centers are in alignment with that of the knitting-cams, and their function is essentially to precede in action the knitting-cams and determine the number of needles which are to be operated by the latter cams during each course. Their form and position are determined by the following conditions: First, a needle must be raised or lowered before the knitting-cams engage it, and hence the incline of the fashioning-cams must be circumferentially so placed as to precede the knitting-cams; second, the movements whereby the needles are rendered inoperative or operative occur in reciprocating and on either the forward or backward stroke of the cam-cylinder. Hence each fashioning-cam must have two acting inclines, one for each direction. While the inclines, if properly set, form the only essential part of the cams, these inclines are by preference in each cam connected by level parts—an upper surface for the raising-cam and a lower surface for the depressing-cam— covering the angular space occupied by the knitting-cams. From the construction described it will be seen that when a slide 34 is moved radially outward the outer arm of its T-head will be engaged by the raising-cam 36 and the slide will be elevated, and that when it is moved radially inward the other arm of the head will be engaged by cam 37 and the slide will be depressed.

Around the supporting and needle cylinders is placed the guard-band 13, which normally encircles the upper ends of the series of jacks. The lower portion of the said guard-band is of greater diameter than the upper portion thereof, these two portions being connected by the inclined portion 56. All of the jacks are guided by deep grooves 43, formed on the supporting-cylinder 3, and in rising are kept in engagement with the needles by the guard-band 13, which presses against their upper external surface when the said band is in the position shown in Fig. 3. When the fashioning-jacks approach the lower limit of their stroke, their inclined ends strike an annular projection 44 on the vertical annular guide 45, which annular projection co-operates with the guard-band in forcing them to assume an upright position. The joint between each jack and its lever is guarded by the said annular guide 45, which has a radial slot for each fashioning-jack and which is bolted to bed-plate 6. The lower extremities of the horizontal slides 38 are guided by radial grooves which are formed in the semicircular plate 46, Figs. 3 and 10, also bolted to bed-plate 6, to which plate are secured the circular radially-slotted lever-guide 47, the standards 48, carrying the fulcrum-wire 33, and the standards 49, on which and on the projections 16 the upper guide-bed 50 for the horizontal slides rests and is secured. The guide 50 has grooves which are the same in number and direction as those of the lower guide 46, and it is provided with a retaining-plate 51 for the slides. The vertical slides 34 are guided by the recess in the horizontal slides 38 and by grooves in the annular guide-block 52, which rests on and is bolted to the upper guide-bed 50, as shown in Fig. 9, and has grooves the same in number and direction as those of said guide 50.

In removing the cylinder it is necessary to disconnect the jacks from the needles, which is effected as shown in Fig. 4. In the flange of the cam-cylinder are fitted cylindrical vertically-reciprocating pins 12 12, which are capable of engagement with or disengagement from the guard-band 13, toes on their lower ends fitting a groove in the upper external part of the said band. When the pins are so engaged, the operator, grasping the upper outturned portions of the pins, raises the band from the position shown in Fig. 3 to that shown in Fig. 4. Each pin is provided with a retaining-spring 14, which is fixed at one end to the flange of the cam-cylinder, the free end thereof fitting corresponding grooves in the pin for retaining the band in either its upper or its lower position. The guard-band is raised with its lower flaring portion opposite the tops of the jacks, and the spring-catches 14 14 hold it thus elevated. The operator then depresses the handle of the double crank 54, Figs. 1 and 6, which is suitably supported from the table 7. The crank 54, through the links 55 55, is pivotally joined to the ejecting-ring 25, which ring surrounds the supporting-cylinder inside of the series of jacks. When the ejecting-ring is raised, it presses against the upper incline of the jacks and throws them outward from the needles. The cylinder, with its needles, is then removed. In replacing it the cylinder is first inserted, the guard-band and ejecting-ring being still raised, and is guided into place by the cylinder 3 and the pin 2. Then the ejecting-ring 25 is lowered and the catches 14 14 are tripped, allowing the pins 12 and the guard-band 13 to fall, when the incline 56 between the larger and lesser bores of said band strikes the jacks and forces them positively into engagement with the needles. The guard-band in its reciprocation is guided by the outer grooved surface of cylinder 3 and rests on the incline 569 of said grooves.

In Figs. 11, 12, and 13 is shown a modification of the jack and slide mechanism, which dispenses with the lever. In this modification the butt of the jack 57 is engaged by a vertical slide 58, the latter having a T-head, its lower end being formed with an inturned and forked extension for grasping the jack, the said slide 58 being moved radially by the horizontal slide 59, which is slotted for guiding and engaging the slide 58, and has at its outer end a pin for engaging the indicating-cam, the said cam with the remainder of the mechanism being similar to that above described. It will be observed that the vertical slide in either case is essentially but such an extension of the butt of the jack as will permit the engagement of the latter with the fashioning-cams.

The indicating-cams 39 and 40 for both cylinders, with their driving mechanism, are shown in Sheet 4. These cams, which are annular bands, move in guide-grooves cut in the projections 16 and have, as previously stated, similar paths, cam 40 having its acting surface turned downward, while cam 39 faces upward. They have each an inner and an outer path connected by an incline, these paths being each sixty degrees in length. Since in tubular knitting all of the needles are active, the cams 39 40 are then so placed as that the horizontal slides are in the inner paths thereof with the vertical slides in range of the lowering-cam 37. When narrowing begins, cams 39 and 40 move step by step to the rear until the horizontal slides are all in the outer paths of such cams and all of the fashioning-needles are raised by cam 36. Then widening begins and the cams reverse their motion, returning gradually to their original position, when the fashioning-needles are all lowered and tubular knitting again begins.

It will be observed that the inner and outer path of cams 39 and 40 are concentric with the needle-cylinder; that the inclined portions of the path occupies an angular space equal to or less than that between two consecutive needles; that by the devices hereinafter described the cams are moved alternately, each making a movement during every other course; that this movement is just sufficient to advance or retract one horizontal slide; that it occurs when the fashioning-cams are circumferentially out of range of the vertical slides, and that finally, since the needles are lowered in an order the inverse of that in which they were raised, the order relatively to each other in which during widening the indicating-cams move must be the reverse of that in which they move during narrowing—i. e., if cam 39 moves during the odd courses in narrowing it must move during the even courses in widening. The cams are essentially but annular segments and are made of circular form for convenience in guiding only.

Cams 39 39 are by links 60 pivotally connected to each other and to crank 61, which is fixed on shaft 62. Cams 40 40 are pivotally joined to each other and to crank 63 by link 64, crank 63 being fixed to shaft 65. Shaft 62 passes through the table 7 and carries at its lower extremity a bevel-gear 66, which is in mesh with the two bevel-gears 67 67, the latter being similar each to each, both loose on the same shaft 68, and both recessed for the tongues of a double clutch member 69, which is feathered on shaft 68 and capable of axial movement thereon. Shaft 68 is supported in bearings in a bracket 70, bolted to table 7, and on said shaft there is also keyed a main ratchet 71, on whose hub a masked ratchet 72 revolves loosely. Loosely mounted on shaft 68 there is a pawl-crank 73, which actuates the ratchets. A link 74 is pivotally joined to each crank 73 and to a crank 75, placed horizontally in front of the former crank. The mechanism thus far described for moving shaft 62 is duplicated on the left of the needle-cylinder for shaft 65, and is there designated by the same reference-numbers.

The cranks 75 75 for the right and left pawl-cranks 73 73 are fixed to a rock-shaft 76, extending from one bracket 70 to the other and journaled in both. On said shaft 76 is fixed crank 77, which is pivotally united to link 78, which link is pivotally united to and driven by bell-crank 79, actuated by cam-rod 80, engaging cam 81, fixed to a clutch-sleeve 82. This sleeve during reciprocating knitting is driven by the main shaft 83, Fig. 2, in a manner which will be made to appear hereinafter. The cam-rod 80 moves in guideways 84, fixed to base-plate 85, on which guideways the bell-crank 79 is also fulcrumed. Shaft 83 makes one revolution for each complete reciprocation of the cam-cylinder, and cam 81 has two inner and two outer points in its path. From the construction described it is evident that each of the pawl-cranks 73 73 is reciprocated during every reciprocating movement of the cam-cylinder, and hence that all of the cams 39 and 40 would be actuated during every such movement were it not for the interposition between the pawl-cranks 73 73 and the main ratchets of the masked ratchets 72 72, which make a complete revolution during pouch-knitting and have every alternate tooth masked excepting at two points one hundred and eighty degrees apart, where, as shown in Figs. 17 and 18, there are respectively two consecutive full and two consecutively masked teeth on each ratchet. In narrowing the ratchets are so set as that the indicating-cams move alternately, and when the narrowest course is reached the double teeth, masked in one case and full in the other, come under the respective pawl-cranks, whereupon one of said cranks 73 moves its main ratchet on two consecutive courses, while the other ratchet is idle during the same period. Thus the order of motion of the cams is changed. At the end of widening the order is in the same manner changed again for a subsequent narrowing. It will be observed that cam 81 simply produces motion of the indicating-cams without determining the direction of that motion, which direction must be fixed by the position of the clutch members 69 69. Since shafts 68 68 move in the same direction, these members must at the same time be both in engagement with the outer or both with the inner bevel-gears 67 67. Their change of position is, between narrowing and widening, or vice versa, effected in the one case by lever 86 and in the other by levers 87 88, lever 86 being fulcrumed on the bracket 89, fixed to base-plate 85, and levers 87 88 being fulcrumed on bracket 90, secured to the said base-plate and framing. The lever 86 is forked at its upper end and pivotally united to the loose collar of the right-hand clutch 69, its lower end being pivotally connected to the cam-slide 91. The lever 87 is forked at its upper end and pivotally joined to the collar of the left-hand clutch 69 and at its lower end is pivotally joined to the lever 88, the lower end of the latter being joined pivotally to the said cam-slide 91. The slide 91 reciprocates in guides 92, secured to the base-plate, and has fixed to it a pin 93, which engages the path of a cam 94, which cam is fixed to a shaft 95, journaled in brackets 96 secured to base-plate 85, and is during reciprocating knitting intermittingly rotated by the ratchet 97, actuated by pawl-crank 98, which is pivotally united to the rod 99 of the eccentric 999, keyed to clutch-sleeve 82.

Cam 94 is shown in development in Fig. 19. It by preference makes a complete revolution during pouch-knitting, and has straight inner and outer parallel paths of equal extent connected by inclines, said inclines being one hundred and eighty degrees apart and equal to or less in angular extent than the movement given the cam by one impulse of the pawl-crank. From the construction described it will be seen that during narrowing and widening the cam-slide and levers are at rest and that between narrowing and widening—i. e., at the middle and end of the pouch—the pin 93 moves from one of the paths of cam 94 to the other, thus changing the positions of the levers 86 87 88 and of clutch members 69 69.

The clutch-sleeve 82, Fig. 2, is loose on shaft 83, but capable of engagement with said shaft through the clutch member 100. The said clutch member is feathered on said shaft, the loose collar thereof being engaged and reciprocated by the forked bell-crank 101, fulcrumed on the framing and engaging through a "Hooke" joint the strap of eccentric 102, fixed to shaft 103, said shaft having, as will be hereinafter explained, an intermittent rotation just previous to the beginning and end of pouch-knitting.

In regard of the mechanism for driving the indicating-cams it will be observed that each masked ratchet determines the particular courses on which impulses shall be given to its indicating-cams and that cam 94 fixes only the direction of motion of said cams. Hence inasmuch as the number and position of the full and masked teeth of the ratchets and of the inclines and straight sections of cam 94 can be greatly varied, it follows that in reciprocating the form of the web may in many ways be changed. It will also be observed that the double levers 87 and 88, Fig. 15, can be replaced by a single lever similar to lever 86 if the left-hand shaft 68 moves in the reverse direction. In that event in changing the direction of the indicating-cams both clutch members 69 will move in the same direction. A modification of the mechanism by which eccentric 999 is omitted is shown in Figs. 44 and 45, Sheet 7. In this modification the essential features are the omission of eccentric 999 and the replacing of pawl-crank 98, cam-slide 80, and bracket 96 by a bell-crank $98^{\times}$, whose horizontal arm carries a pawl that engages ratchet 97, a cam-slide $80^{\times}$, similar to cam-slide 80, excepting that it is fitted to engage pivotally the vertical arm of bell-crank $98^{\times}$ and a bracket $96^{\times}$, similar to bracket 96, excepting that it is of greater length. It is obvious that the clutch members 69 69 must not be moved while the pawl-cranks 73 73 are advancing. Hence the bell-crank $98^{\times}$ is so formed and set with respect to said pawl-cranks as that it shall be actuating its ratchet while they are retracting their pawls. From the construction described it will be seen that the cam 81 actuates ratchet 97 and the main ratchets.

The intermittingly-rotating shaft 103 is similar in function and in the time and nature of its motion to the "change-shaft" D described by us in United States Patent No. 410,071, to which reference may be had. It makes a semi-revolution just previous to the beginning of a pouch and completes its revolution just before the end of the pouch-knitting. The mechanism by which this is effected is shown in Fig. 2 and in Figs. 23 to 27, inclusive. On shaft 103 is keyed the spur-gear 104, which is in mesh with spur-gear 105, loose on main shaft 83. On the extended hub of gear 105 are keyed its driving-ratchet 106 and the reversed retaining-ratchet 107, and loose on said hub there is fitted the crank 108, carrying pawl $108^{7}$, which engages the ratchet 106 and carrying also the spring-pressed retaining-hook 109, engaging ratchet 107, the upper extremity of said crank having an axially-projecting lug $108^{8}$. From the retaining-hook 109 a tripping-rod 110, formed with a toe projecting toward and beneath a projection from said hook, passes to a crank 111, with which it is pivotally joined, said crank being fixed to rock-shaft 112, on which there is keyed the crank 113, to which is pivotally connected the link 114, the latter being pivotally joined to the bell-crank 115, pivoted on shaft 116 and suitably spring-pressed on pattern-chain 117, which is revolved by the sprocket-drum 118. To crank 108 and to base-plate 85 there is attached the spiral spring 119, which tends always to draw said crank downward, and on said base-plate is secured the bracket 120, which has a downward projection for arresting the motion of crank 108 and a socket for guiding rod 110, and carries a detent 121 for the main ratchet 106. The pattern-chain 117 has, as shown, inclined links which work at the beginning and end of pouch-knitting, and from the construction described it will be seen that when one of said links passes under the bell-crank 115 the latter will, through the connections described, lift the tripping-rod 110 and trip the retaining-hook 109, thus releasing crank 108, which will by a spring be drawn backward until the retaining-hook strikes the next rearward tooth or ratchet 107, when the crank will be held in the dotted position shown with its pawl in engagement with the next rearward tooth of ratchet 106. The mechanism thus far described is in many respects the same as that specified by us for the same purpose in the patent above referred to. On shaft 83 is keyed the clutch member 122, with which engages the double crank 123, Fig. 27, having a grooved clutch member for engaging member 122, a lug at one extremity projecting toward the path of rotation of the lug of crank 108, and two arms one hundred and eighty degrees apart extending axially in the other direction and carrying pins, which engage the path of a cam 124, fixed to the framing. The crank 123 is loosely mounted on shaft 83, and it will be seen that as said shaft revolves the crank will revolve with it, and also move axially an amount determined by the path of the fixed cam 124, which is shown in development in Fig. 26. This cam has equal paths for the two pins so proportioned and set as that crank 123 shall, when it reaches the dotted position of crank 108, have its lug fully extended into the path of rotation of the lug of the latter crank. The said lug or crank 123 will therefore engage the lug of said crank 108 and carry it forward until it reaches the full-line position, when the lug of crank 123, which has been gradually retreating, will be fully withdrawn from the path of the lug of crank 108, and will thus cease to drive the latter crank, which, if the momentum be excessive, will be stopped by the projection from bracket 120. As crank 108 moves forward its pawl-engaging ratchet 106 moves said ratchet with spur-gears 105 and 104 and shaft 103, leaving the retaining-hook in position for subsequent tripping. The cams, ratchets, and gears are so proportioned as that each movement of shaft 103 shall preferably be a semi-revolution.

On shaft 103 is keyed the cam 125, Fig. 2, as shown in right-hand (from the front) elevation in Fig. 22, which reciprocates the jack-holders of both needle-cylinders through the cam slide 126, which engages it and moves in guideways 127, attached to the framing. The said cam-slide is pivotally connected with the bell-crank 128, which is suitably fulcrumed on the framing, and with this crank is also pivotally joined the link 129, which is united pivotally with the crank 130, keyed to shaft 31, on which shaft are also keyed the cranks 30 of both jack-holders. Cam 125 has, as shown, inward and outward sections of its path at points one hundred and eighty degrees apart and connected by spiral inclines.

The means for driving the cam-cylinders and for imparting thereto either a continuous rotary movement in one direction or a reciprocating rotary movement will now be described. The belt by which power is transmitted to the machine passes around the pulley 131, fast on the power-shaft 133, which revolves in the bracket 134, affixed to the base-plate 85. On said shaft is also mounted the loose pulley 132. On its inner end said shaft carries a spur-gear 135, which meshes with another and larger gear 136, fixed to shaft 83. On the latter shaft is keyed a spur-gear 137, which engages a gear 138, loose on shaft 103. The latter gear is in mesh with a gear 139, loose on a shaft 22, which has cast with it a clutch member 140. Gears 137 and 139 are equal in all respects. At the left-hand end of shaft 83 is keyed the crank 141, pivotally connected with which is the link 142, which pivotally engages the crank 143, loose on shaft 22 and having cast with it a clutch member 144. Facing clutch members 140 and 144 there are complementary clutch members 145 and 146, respectively, which are each feathered to shaft 22 and capable of axial movement thereon. The loose collar of the clutch member 146 forms part of a cam-slide 147, Fig. 28, which is guided in the framing and has a pin engaging the path of cam 148, fixed to shaft 103. The cam-slide is of such length as that when either of clutch members 145 or 146 is in engagement with its complementary member the other of such clutch members shall be fully disengaged from its complementary member. Crank 143 is longer than crank 141 by an amount sufficient to give the former, preferably, either one hundred and twenty degrees or ninety degrees of angular motion for each semi-revolution of the latter, in which case the bevel-gear 21 is preferably made three or four times the diameter of bevel-gear 20, while the diameters of spur-gear 18 and annular gear 17 are preferably equal. Cam 148 is shown in development in Fig. 29. It has two straight sections distant axially an amount equal to the required stroke of cam-slide 147 and connected by two inclines spaced one hundred and eighty degrees apart circumferentially. These inclines are sufficiently short. The motion of shaft 103 is sufficiently swift, and the clutch members 145 and 146 are so set that the engaging portions of the complementary member of each of such clutch members shall be approximately opposite those of said clutch member when engagement and disengagement occur. From the construction described it will be seen that clutch member 140 always revolves and clutch member 144 always oscillates, that during tubular knitting clutch members 140 and 145 are in engagement and shaft 22 and the cam-cylinders are rotated, that just previous to pouch-knitting shaft 103 moves, cam-slide 147 makes a stroke to the left, clutch members 140 and 145 are disengaged, clutch members 144 146 are engaged, and shaft 22 and the cam-cylinders are reciprocated, and that at the end of pouch-knitting shaft 103 completes its revolution, the movements are reversed, shaft 22 again revolves, and tubular knitting is resumed. The mechanism consists, essentially, of a constantly-oscillating and a constantly-revolving clutch member placed on a single shaft, with means of engaging either to and simultaneously disengaging the other from said shaft, the only absolute requirement being that when engagement or disengagement occurs the engaging portions of the complementary members shall be approximately opposite those of their respective clutch members. Engagement and disengagement are effected so rapidly that the direction of motion of either clutch member with respect to its complementary member is immaterial. Any of the usual means which will effect the revolution of clutch member 140 may be employed, the train of gearing herein shown being used only as a convenient form.

Another means of oscillating the clutch member 144 and of revolving clutch member 140 is shown in Figs. 42 and 43, Sheet 7. In said Figs. 42 and 43 is shown a modification of the mechanism for revolving and reciprocating the cam-cylinders, in which the essential points of difference are the omission of the idler-gear 138 and the substitution for crank 141, link 142, and loose crank 143 of, respectively, cam 141$^\times$, rack-bar 142$^\times$, and gear 143$^\times$, loose on shaft 22. As shown, the change-shaft 103 is in the same plane horizontally as the main shaft 83, and power is transmitted to the latter through the pulley 131, fixed to said shaft, on which also is fixed the spur-gear 137, which through spur-gear 139 rotates the clutch member 140. The clutch member 144 is formed with a mutilated spur-gear 143×, which engages the teeth of a guided rack-bar 142×, the latter having fixed to it a pin which engages the path of a cam 141×, fixed to shaft 83, which cam has preferably one inner and one outer point in its path. From the construction described it will be seen that when the shaft 83 is rotated the clutch member 140 will be revolved and the clutch member 144 will be oscillated. The giving of motion to shaft 22 from either of said clutch members is effected in the same manner and by the same mechanism as that previously described. The chain-drum 118, Figs. 23, 24, and 25, is driven by the spur-gear 149, fixed to the hub of gear 139, gear 149 meshing with spur-gear 150, which to reduce the length of the chains is made twice the diameter of gear 149. Gear 150 rotates on a spindle 151 and has cast with it a cam 152, which oscillates the bell-crank 153, which bears on it, and is pivoted to the framing. Pivotally connected with the bell-crank 153 and pawl-crank 154 is the link 155, the said pawl-crank being loose on shaft of drum 118 and driving a ratchet 156, keyed to said shaft, by which the drum and its attached chains are moved. The drum and driving mechanism shown are suitably supported from the table 7 by bracket-framing, being omitted for clearness.

The mechanism for inserting and removing the thickening-thread in the pouches and for throwing into and out of action the take-up springs for both the thickening and main threads is shown in Sheets 1 and 6. Since the operations involved are somewhat varied and preferably are performed during a relatively considerable time, the mechanism is so designed as to give motion to a main cam-shaft 157, Figs. 30 and 31, during the time taken by the main shaft 83 to make a semi-revolution. On said shaft 83 is keyed the miter-gear 158, which, through the similar gear 159, keyed to shaft 160, gives to the latter shaft a motion in unison with that of shaft 83. Shaft 160 passes through table 7, and on its top is pinned the circular plate 161, carrying at equal circumferential and radial distances two lugs 162 162, either of which is capable of engaging a similar lug 163, depending from the block of a crank 164, fixed to the auxiliary cam-shaft 165. The block carrying lug 163 is capable of a limited reciprocation in a slot in crank 164, being pressed outward by a spring 166 and held at the outer limit of its stroke by a plate. (Not shown.) Encircling shaft 165 is the cam-slide 167, moving in guides 168, secured to table 7, which slide carries two depending lugs 169 169, Fig. 34, either of which when moved toward shaft 165 is capable of engaging and retracting the roller of the block which carries the lug 163, so that said lug shall be out of the path of rotation of lugs 162 162. The stroke of slide 167 is so proportioned that when said slide moves and one of its lugs 169 releases the lug 163 the other lug 169 is in position to catch and retract said lug 163, when, through either of the constantly-revolving lugs 162, the crank 164 has been carried through a semi-revolution. Keyed to the top of shaft 165 is the spur-gear 170, which meshes with the similar gear 171, keyed to the main cam-shaft 157, said cam-shaft being supported by a standard 172, resting on the auxiliary table 173, which is suitably supported from the main table 7. From the construction described it will be seen that whenever cam-slide 167 is given a stroke in either direction the main cam-shaft will be moved through a semi-revolution in unison with shaft 83.

The reciprocation of cam-slide 167 is effected, as shown in Figs. 1 and 2, by the bell-crank 174, pivotally joined with said slide and suitably fulcrumed on table 7, with which bell-crank is pivotally connected the link 175, the latter being also pivotally connected with a bell-crank 176, suitably fulcrumed on table 7. The other arm of bell-crank 176 is pivotally joined to a slide-rod 177, moving in the guideway 178, fixed to table 7. Rod 177 is pivotally joined to the bell-crank 179, Figs. 23 and 25, pivoted on shaft 116, said bell-crank bearing on the pattern-chain 180, which is revolved by the chain-drum 118. Chain 180 has, as shown, two series of high and two series of low links, these two heights operating to retain the slide 167 at the opposite limit of its stroke during the entire period of reciprocating and tubular knitting, respectively.

In addition to the standard 172 there are secured on the auxiliary table 173 two standards 181 181, one in rear of each knitting-cylinder, which standards are, with the attachments shown in Figs. 35 and 36, similar in all respects. The shafts 182, 183, and 184 extend through and are journaled in all of the standards. On the top of each standard 181 there is secured the yarn-frame 185, on which are mounted the spring-drums 186, to which are secured two take-up springs 187 187, one for the main and one for the thickening thread. These take-up springs are free in pouch-knitting, and operate in the well-known manner to keep the yarn taut during that portion of the reciprocation when knitting is not progressing and yarn is not fed.

In tubular knitting it is important that the strain of the spring should be removed from the main thread and that the spring should be inactive. We have also represented the spring for the thickening-thread as being compressed during this time; but this is not essential, and may or may not be done at pleasure. On frame 185 are placed two sets of tension-plates 188, one for each thread, with the customary leading-eyes 189. The front of the frame is formed into a double leading-eye 190, which keeps the two threads at all times separate.

In the take-up shaft is threaded a rod 191, which extends inward toward the center of the cylinder, and there turns at right angles sufficiently to pass through the plane of oscillation of the spring 187 of the main thread. A similar construction may or may not be fitted for the remaining spring 187, as desired. In Fig. 36 a rod 191 is shown provided for each spring 187. It is apparent that when shaft 182 is moved forward spring 187 will be compressed by rod 191 and become inactive. When said shaft moves backward, rod 191 will be lifted from the spring, as shown in the dotted position in Fig. 35, and the latter will be free to act. The oscillation of shaft 182 is at the proper time effected by the cam 192, fixed to shaft 157. This cam is shown in development in Fig. 32. It has an upper level for tubular knitting and a lower level for pouch-knitting, these two levels being connected by inclines, and the center of the levels being one hundred and eighty degrees apart. The cam engages a crank 193, fixed to shaft 182 and on a line radially parallel to rod 191, and suitably pressed on cam 192 by the springs 194, attached to it and to the standards 172. From the construction described it will be seen that the take-up spring 187 will by one semi-revolution of shaft 157 be made active and by the other semi-revolution inactive.

In removing the thickening-thread at the end of pouch-knitting it is led across and cut by the circular knife 195, which revolves whenever shaft 157 moves. The knife is, for safety, partially cased in, only the necessary amount of cutting-edge being exposed, and is fixed to the shaft 196, journaled in the arm 197, fixed to and extending from the standard 181. Shaft 196 carries, also, a fast pulley 198, which through the belt 199 is revolved by the pulley 200, fast to shaft 184, which shaft is in turn revolved by the miter-gear 201, fixed to it and engaging the similar gear 202, fixed to shaft 157.

The separation of the thickening-thread from the main thread for the removal of the former at the close of pouch-knitting is effected by the parting-bar, which consists of a straight section 203, having a hub by which it is fixed to shaft 183, and a section 204, which is pivoted to section 203 and forked at its outer end and has a T-extension at the inner end, this section 204 being pressed by a spring 2040 against section 203, so that normally the two sections lie against each other. The entire bar is capable of vertical oscillation with shaft 183, and the section 204 is also capable of being given a sidewise vibration by the cam 205, fixed to standard 181, this cam engaging the left-hand side of the T-extension of said section. The oscillation of shaft 183 is effected through cam 206, fixed to shaft 157, which cam is shown in development in Fig. 33. It has an upper level, an intermediate level, and a small lower level, all connected by inclines, and, lastly, a vertical return to the upper level. The pin of the crank 207, which it engages, is during tubular knitting on the upper level. At the beginning of pouch-knitting it passes to the mid-level, and at the end of pouch-knitting it returns to the upper level after passing to the lower level. Crank 207 is fixed to shaft 183 on a line radially parallel to the parting-bar and is pressed against cam 206 by a spring 208, attached to it and to standard 172. Cam 205 is shown in front elevation in Fig. 40. Its upper and lower surfaces are in the same vertical plane, while the mid-section is parallel to them but depressed. The three surfaces correspond with the three positions of the parting-bar. From the construction described it will be seen that when the parting-bar is at its highest point its sections are separated. At the mid-level they are together, and at the lower level they are again separated.

The insertion of the thickening-thread is effected through the lever 209, pivoted at 210 on standard 181, the said lever being pressed by a spring 2090, so as to be normally as near the center of the cylinder as possible. The lever 209 is bent at right angles and provided with a depending pin 211 midway of its length, its outer end being forked and extending laterally. The pin 211 bears upon an annular cam 212 projecting from the surface of the pulley 200, which cam has simply a long outer level and a short inner level connected by inclines. During tubular knitting the pin 211 is on the outer level of the cam and the lever is held away from the center line. At the beginning of pouch-knitting the pin passes rapidly to and from the inner level, carrying the lever with the thickening-thread in its forked end against the main thread and then retracting the lever. At the end of pouch-knitting the pin remains on the higher level and the lever is stationary.

The operation of the thread inserting and removing mechanism is as follows: During tubular knitting the parts are in the positions shown in Figs 35 and 36, the parting-bar being fully raised and separated and the inserting-lever to the left, but carrying in its forked extremity the end of the thickening-thread, which is led to it from the left-hand eye 190, the said thread passing through the forked end of the parting-bar 204. At the beginning of pouch-knitting, shaft 157 makes a semi-revolution, and the action of its attached cams and of cams 205 and 212 cause the parts to assume at the moment of insertion the positions shown in Fig. 37, in which the parting-bar is closed to allow the thickening (left) thread to flow freely, and that thread is pressed against the main (right) thread by the forked end of the inserting-lever, which then engages both, while the adherence of the fibers of the thickening-thread to those of the rapidly-feeding main thread is sufficient to enable the latter to carry the former with it through the eye 213 to the yarn-guide and needles. The parting-bar remains in the mid and closed position during the pouch-knitting, but the lever after insertion is rapidly retracted to its former position. At the end of pouch-knitting shaft 157 completes its revolution, and at the moment of the removal of the thickening-thread the positions are as shown in Fig. 38. Here the parting-bar is down and separated, section 203 holding the main (right) thread to its position, while section 204 leads the thickening (left) thread across the revolving knife 195 and holds it forcibly on a pad 214, of rubber or of other yielding material, secured to the top of the bearing 197. The nipping of the yarn on the pad causes the yarn-guide in its motion to draw the thread taut across the knife and it is instantly cut. The parting-bar at once assumes its highest and separated position, carrying the end of the severed thread in its fork, which end is by the operator drawn into the lever 209 preparatory to a subsequent insertion. It is obvious that the function of section 203 of the parting-bar is simply that of a movable shield to retain the main thread always in position, that section 204 is practically a vibrating leading-eye which has always control of the thickening-thread and in addition acts as a nipping-plate in compressing said thread against pad 214, and that the only functions of the lever and knife are respectively to press one thread against the other and to cut said thread. Many methods of accomplishing these ends without using the precise forms of mechanism herein shown could be devised. The standards 181 181 are with their entire attachments similar for each knitting-cylinder, while shafts 182 183 184 pass through both, thus operating simultaneously the mechanism for two cylinders from a single cam-shaft. The shaft 184 is merely a horizontal extension of the shaft 157, and hence cam 212 is in principle the same as a cam placed on the latter shaft with connections to the inserting-levers.

In regard of the shafts 62, 65, and 68 68 we desire to state that it is immaterial as to whether or not shafts 62 and 65 precede the shafts 68 68 in the train of mechanism between the main ratchets 71 71 and the indicating-cams 39 and 40. The shafts 68 68 might be placed vertically and have fixed on them the cranks 61 and 63, with the shafts 62 and 65 horizontal and carrying the main and masked ratchets and pawl-cranks. The only absolute essential is that the shafts nearest the indicating-cams shall be capable of motion in either direction.

We claim as our invention—

1. The combination, with the needle-cylinder having the ring or flange 4 on the interior thereof and socketed for the pin 2, of the supporting-cylinder extending up within the needle-cylinder, the pin 2, and the adjusting screw-threaded ring 5, fitted to a screw-threaded portion of the interior of the supporting-cylinder and engaging with ring 4, substantially as described.

2. The combination, with the cam-cylinder and the guard-band 13, of lifters for the said band, which are carried by the said cam-cylinder and may be engaged with said band and disengaged therefrom, substantially as described.

3. The combination, with the cam-cylinder and the guard-band 13, of lifters for the said band, which are carried by the said cam-cylinder and may be engaged with said band and disengaged therefrom, and catches engaging with the lifters, substantially as described.

4. The combination, with a series of jacks, of a guard-band having a lower flaring base and surrounding the upper ends of the jacks when in its depressed normal position, and devices for lifting the said band to release the jacks, substantially as described.

5. The combination, with a series of jacks, of a movable guard-band for holding the jacks in position, and a movable ejecting-ring for pressing outwardly the jacks, substantially as described.

6. The combination, with a series of jacks having inclined or cam surfaces thereon, of a movable ejecting-ring for acting against such surfaces to press the jacks outward into inoperative position, substantially as described.

7. A jack having the space 247 for engagement with the butt or heel of a needle, the inclined or cam surface 248, and the guiding-extension 246, having the inclined end 245, substantially as described.

8. The combination, with the needles, the guard-band, the ejecting-ring, and the annular guide 44, of the jacks, each having a space 247 for engagement with the butt or heel of a needle, an incline 248 for engagement with the ejecting-ring, and the extension having the inclined end for co-operation with the guide 44, substantially as described.

9. The combination, with the needles, the needle-operating cams, and the jacks for moving the needles vertically out of position for being operated by the said cams and returning them to such position again, of slides in operative connection with the said jacks, and elevating and depressing cams moving with the needle-operating cams for acting upon the said slides when the latter are placed in range therewith to move the same and the jacks and thereby to throw the needles either out of or into operation, as required, substantially as described.

10. The combination, with the needles, the needle-operating cams, and the jacks for moving the needles vertically out of position for being operated by the said cams and returning them to such position again, of vertical slides, levers in operative connection with the said slides and with the jacks, and elevating and depressing cams moving with the needle-operating cams for acting upon the said slides when the latter are placed in range therewith to move the same and through the levers the jacks and thereby to throw the needles either out of operation or into operation, as required, substantially as described.

11. The combination, with the needles, the needle-operating cams, and the jacks for moving the needles vertically out of position for being operated by the said cams and returning them to such position again, of slides in operative connection with the said jacks, elevating and depressing cams moving with the needle-operating cams for acting upon the said slides when the latter are placed in range therewith to move the same and the jacks and thereby to throw the needles either out of operation or into operation, as required, shifter-slides controlling the lateral position of the slides which are in operative connection with the jacks, and indicating-cams for determining the positions of the shifter-slides, substantially as described.

12. The combination, with the needles, the needle-operating cams, and the jacks for moving the needles vertically out of position for being operated by the said cams and returning them to such position again, of vertical slides, levers in operative connection with the said slides and the jacks, elevating and depressing cams moving the needle-operating cams for acting upon the said slides when the latter are placed in range therewith to move the same and through the levers the jacks and thereby to throw the needles either out of operation or into operation, as required, shifter-slides controlling the lateral position of the vertical slides, and indicating-cams for determining the positions of the shifter-slides, substantially as described.

13. The combination, with the knitting-cams, the needles, and the jacks, of oppositely-acting fashioning-cams and movable connections of the said jacks adapted to be placed in position for being engaged by the desired fashioning-cam to shift the jacks and needles, substantially as described.

14. The combination, with the knitting-cams, the needles, and the jacks, of slides in operative connection with the said jacks, fashioning-cams acting upon said slides to change the position of the jacks and move the needles out of or into operative relations with the knitting-cams, as required in narrowing and widening, and indicating devices for determining the position of said slides and their engagement by the fashioning-cams and thereby determining the operation of the needles, substantially as described.

15. The combination, with the knitting-cams, the needles, and the jacks, of slides in operative connection with the said jacks, fashioning-cams acting upon said slides to change the position of the jacks and move the needles out of or into operative relations with the knitting-cams as required in narrowing and widening, shifter-slides engaging the slides first mentioned, and the indicating-cams acting upon the shifter-slides to determine the engagement of the other slides by the fashioning-cams, substantially as described.

16. The combination, with the knitting-cams, the needles, and the jacks, of slides in operative connection with the said jacks, fashioning-cams acting upon said slides to change the position of the jacks and to move the needles out of or into operative relations with the knitting-cams as required in narrowing and widening, the said fashioning-cams preceding in action the knitting-cams, and indicating devices for determining the position of the said slides and their engagement by the fashioning-cams and thereby determining the operation of the needles, substantially as described.

17. The combination, with two or more pairs of indicating-cams pertaining to a corresponding number of knitting-heads, of rods connecting together the corresponding cams of the respective pairs, two crank-arms in connection with such rods, shafts on which said crank-arms are mounted, and devices whereby the said shafts are respectively given a step-by-step movement of rotation first in one direction and then in the other, substantially as described.

18. The combination, with an indicating-cam, of actuating devices therefor comprising two rotating shafts, a bevel gear-wheel fast on one of the said shafts, two bevel gear-wheels loose on the other of said shafts, a clutch member mounted to turn with the latter shaft, means for causing said clutch member to engage alternately with the two loose bevel gear-wheels, means for rotating that one of the said shafts which serves as the driver, and a connection between the indicating-cam and the driven shaft, substantially as described.

19. The combination, with an indicating-cam, of actuating devices therefor comprising two rotatory shafts, a bevel gear-wheel fast on one of said shafts, two bevel gear-wheels loose on the other of said shafts, a clutch member mounted to turn with the latter shaft, means for causing said clutch member to engage alternately with the two loose bevel gear-wheels, means for connecting that one of the said shafts which is the driven shaft with the indicating-cam, a ratchet-wheel connected with the other of the said shafts, a pawl, means for actuating the said pawl, and a loose masked ratchet-wheel for determining the engagement of the pawl with the ratchet-wheel first mentioned and determining the courses at which impulses shall be given to the indicating-cam, substantially as described.

20. The combination, with an indicating-cam, of actuating devices therefor comprising two rotatory shafts, reversing-gearing interposed between said shafts, whereby one of the said shafts may be driven from the other thereof in either direction, as required; a connection between the indicating-cam and that one of the said shafts which is the driven shaft, a ratchet-wheel in connection with that one of the said shafts which is the driver-shaft, a pawl, means for actuating the said pawl, and a loose masked ratchet-wheel for determining the engagement of the pawl with the ratchet-wheel first mentioned and determining the courses at which impulses shall be given to the indicating-cam, the said masked ratchet-wheel having at one point two shallow notches side by side and at another point two deep notches side by side, substantially as described.

21. The combination, with an indicating-cam, of actuating devices therefor comprising two rotatory shafts, a bevel gear-wheel fast on one of the said shafts, two bevel gear-wheels loose on the other of the said shafts and engaging the bevel gear-wheel on the first-mentioned shaft, a sliding clutch member mounted on the latter shaft to turn therewith, a pattern-cam, connections intermediate the said pattern-cam and the sliding clutch member through which said cam operates to move the said sliding clutch member upon the shaft and cause it to engage alternately with the two loose bevel gear-wheels, means for connecting that one of the said shafts which is the driven shaft with the indicating-cam, a ratchet-wheel connected with the other of said shafts, a pawl, means for actuating the said pawl, and a loose masked ratchet-wheel for determining the engagement of the pawl with the ratchet-wheel first mentioned and determining the courses at which impulses shall be given to the indicating-cam, substantially as described.

22. The combination, with an indicating-cam, of actuating devices therefor comprising two rotatory shafts, reversing-gearing interposed between said shafts, whereby one of the said shafts may be driven from the other thereof in either direction, a pattern-cam and connections controlling the action of the said reversing-gearing, means for connecting that one of the said shafts which is the driven shaft with the indicating-cam, a shaft which operates during reciprocating knitting, and operative connections of the said shaft intermediate the shaft and the pattern-cam and also intermediate the shaft and that one of the two shafts aforesaid which acts as the driver, the said connections embracing a clutch member for connecting the same with and disconnecting the same from the said shaft which operates during reciprocating knitting, substantially as described.

23. The combination, with an indicating-cam, of actuating devices therefor comprising two rotatory shafts, reversing-gearing interposed between said shafts, whereby one of the said shafts may be driven from the other thereof in either direction, a pattern-cam and connections controlling the action of the said reversing-gearing, means for connecting that one of the said shafts which is the driven shaft with the indicating-cam, a shaft which operates during reciprocating knitting, operative connections of the said shaft intermediate the shaft and the pattern-cam and also intermediate the shaft and that one of the two shafts aforesaid which acts as the driver, the said connections embracing a clutch member for connecting the same with and disconnecting the same from the said shaft which operates during reciprocating knitting, a controlling-shaft, and connections from said shaft to said clutch member, whereby the latter is actuated, all substantially as described.

24. The combination, with the change-shaft, of a gear-wheel fast thereon, a loose gear-wheel in engagement therewith, a driving ratchet-wheel and reversed ratchet-wheel connected with the latter gear-wheel, a loose pawl-crank engaging the driving-ratchet and having an axially-projecting lug, a retaining-hook carried by said pawl-crank and engaging the reversed ratchet, a tripping-rod for the retaining-hook, pattern devices for controlling the position of the tripping-rod, a spring acting upon the pawl-crank to retract the same, a rotating shaft, a double crank mounted on said shaft to rotate therewith and to slide axially thereon and having an axially-projecting lug to engage the lug on the pawl-crank, and a stationary cam with which pins on the double crank engage, substantially as described.

25. The combination, with the cam-cylinder, of a shaft geared thereto, a gear-wheel loose on said shaft, an arm or segment loose on said shaft, a clutch member mounted on the shaft to turn therewith, a cam in direct engagement with the said clutch member for moving the same longitudinally on the shaft to engage it with either the loose gear-wheel or the loose arm or segment, a rotatory shaft, gearing for driving the said loose gear-wheel from said shaft, and means connected with the said shaft for imparting a rotatory reciprocating movement to said loose arm or segment, substantially as described.

26. The combination, with the cam-cylinder, of a shaft geared thereto, a gear-wheel loose on said shaft, an arm or segment loose on said shaft, a clutch member mounted on the shaft to turn therewith, a cam in direct engagement with the said clutch member for moving the same longitudinally on the shaft to engage it with either the loose gear-wheel or the loose arm or segment, a change-shaft on which the said cam is mounted, a rotary shaft, gearing for driving the said loose gear-wheel from said rotary shaft, means connected with the said rotary shaft for imparting a rotary reciprocating movement to the said loose arm or segment, and devices through which a movement of partial rotation is communicated intermittingly to the change-shaft, substantially as described.

27. The combination, with the cam-cylinder, of a shaft geared thereto, a gear-wheel loose on said shaft, a segment loose on said shaft, a clutch member mounted on the shaft to turn therewith, a cam in direct engagement with the said clutch member for moving the same longitudinally on the shaft to engage it with either the loose gear-wheel or the loose segment, gearing for driving the said loose gear-wheel from said rotary shaft, a cam connected with said rotary shaft, and a rack-bar operated through said cam and in engagement with the segment for reciprocating the latter, substantially as described.

28. The combination, with a rotatory crank having a projecting part or lug, of a second rotatory crank having a projection or lug movable thereon and adapted for engagement with the projection or lug of the crank first mentioned, and a pattern-controlled slide which by its position controls the engagement of the projections or lugs with each other and the time of the rotation of the two cranks in unison, substantially as described.

29. The combination, with the rotatory double crank 161, of the crank 164, carrying a spring-pressed lug or block, and the cam-slide 167, having portions 169, substantially as described.

30. The combination, with a rotatory crank having a projecting part or lug, of a second rotatory crank having a projection or lug movable thereon and adapted for engagement with the projection or lug of the crank first mentioned, a pattern-controlled slide which by its position determines the engagement of the projections or lugs with each other and the time of the rotation of the two cranks in unison, a shaft with which one of the said cranks is operatively connected, cams on the said shaft, shafts operated by the said cams, a take-up, a device connected with one of the said shafts for rendering the said take-up operative and inoperative as that shaft is rocked, and devices controlling a splicing-thread actuated by the other of said shafts, substantially as described.

31. The combination, with the rotatory double crank 161, of the crank 164, carrying a spring-pressed lug or block, the cam-slide 167, having portions 169, a shaft with which crank 164 is in operative connection, cams on the said shaft, arms acted upon by the said cams, shafts on which said arms are respectively mounted, a take-up spring, an arm on one of the last-mentioned shafts serving to compress and release the said spring as that shaft is rocked, and devices controlling a splicing-thread actuated by the other of said shafts, substantially as described.

32. The combination, with a rotatory crank having a projecting part or lug, of a second rotatory crank having a projection or lug movable thereon and adapted for engagement with the projection or lug of the crank first mentioned, devices operating to control the engagement of the projections or lugs with each other and thereby to cause the two cranks to move in unison and to terminate such movement, a shaft with which one of said shafts is in operative connection, and thread-supply devices operated from the said shaft, substantially as described.

33. The combination, with the rotatory double crank 161, of the crank 164, carrying a spring-pressed lug or block, devices operating to control the engagement of the said spring-pressed lug or block with the lugs of the double crank and thereby to cause the crank 164 to be moved by the double crank and terminate such movement, a shaft with which crank 164 is in operative connection, and thread-supply devices operated from said shaft, substantially as described.

34. The combination, with a take-up spring, of an arm for compressing and rendering inactive the said spring, a shaft by which said arm is carried, and devices whereby said shaft is rocked, substantially as described.

35. The combination, with the double guide 190 and the guide 213, of an inserting-lever constructed to engage with the end portion of a thickening-thread extending from the guide 190 and to place it in contact with a main thread, and means for moving said lever to cause it to bear the thickening-thread engaged thereby over toward and against the main thread as the latter proceeds to the guide 213 from the said guide 190 and afterward withdraw and leave the thickening-thread engaged with the main thread, substantially as described.

36. The combination, with the double guide 190 and the guide 213, of a spring-pressed inserting-lever 209, constructed to engage with the end portion of a thickening-thread extending from the guide 190 and to place it in contact with a main thread, and a cam acting in opposition to the spring, the lever being operated to cause it to bear the thickening-thread engaged thereby over toward and against the main thread as the latter proceeds from the guide 190 to the guide 213 and afterward withdraw and leave the thickening-thread engaged with the main thread, substantially as described.

37. The combination, with knitting devices embracing a series of knitting-needles, of thread-guides for a thread passing to said needles, a movable arm constructed to engage between said guides with a thread passing through said guides, means for moving said arm, a pad against which the thread may be borne by the said arm and thereby held clamped, and a cutter interposed between the said pad and the needles, substantially as described.

38. The combination, with a take-up, an arm for controlling the action of the take-up, a rock-shaft carrying the said arm, a parting-bar having a movable member adapted to engage with the thickening-thread, a second rock-shaft carrying said parting-bar, means for swinging the said movable member laterally as the said second shaft is rocked, and a cutter against which the thickening-thread is carried by the movement of the parting-bar and its shaft, of actuating devices for said rock-shafts, substantially as described.

39. The combination, with a take-up, an arm for controlling the action of the take-up, a rock-shaft carrying the said arm, a parting-bar having a movable member adapted to engage with the thickening-thread, a second rock-shaft carrying said parting-bar, means for swinging the said movable member laterally as the second shaft is rocked, a rotatory shaft, a cutter and cam carried thereby, and an inserting-lever acted upon by the said cam, of an operating-shaft, gearing for connecting the latter with the said rotatory shaft, cams on said operating-shaft acting upon arms on the rock-shafts, and devices for communicating to said operating-shaft movements of rotation at intervals, substantially as described.

40. The combination, with a movable shield 203 for holding the main thread to its place when the thickening-thread is drawn over to be cut, and an arm 204 for parting the thickening-thread from the main thread and placing the former in position to be cut, of means for vertically reciprocating, when required, the movable shield and arm and also for moving the arm laterally away from the shield, and a cutter against which the thickening-thread is carried by the vertical movement of the shield and arm, substantially as described.

41. The combination, with a movable shield 203 for holding the main thread to its place when the thickening-thread is drawn over to be cut, and an arm for parting the thickening-thread from the main thread and holding the former in position for being cut, of devices for moving vertically, when required, the shield and arm and also for moving the arm laterally away from the shield, a cutter against which the thickening-thread is carried by the vertical movement of the shield and arm, and a pad adjacent to the cutter against which the thickening-thread is pressed by the arm, substantially as described.

42. The combination, with the shaft 183 and means for rocking the same, of the parting-bar carried by the said shaft composed of the fixed section and the spring-pressed pivoted section and the fixed cam 205, substantially as described.

43. The combination, with the shaft 183 and means for rocking the same, of the parting-bar carried by the said shaft composed of the fixed section and the spring-pressed pivoted section, the fixed cam 205, and the rotatory cutter, substantially as described.

44. The combination, with the shaft 183 and means for rocking the same, of the parting-bar carried by the said shaft, composed of the fixed section and the spring-pressed pivoted section, the fixed cam 205, the rotary cutter, and the pad 214, substantially as described.

In testimony whereof we affix our signatures in presence of two witnesses.

ALEXANDER T. CATHCART.
WILLIAM L. CATHCART.

Witnesses:
E. H. BAILEY,
E. R. PERROT.

It is hereby certified that in Letters Patent No. 472,029, granted April 5, 1892, upon the application of Alexander T. Cathcart and William L. Cathcart, of Gwynedd, Pennsylvania, for an improvement in "Circular-Knitting Machines," errors appear in the printed specification requiring correction, as follows: In line 15, page 1, the word "groove" should read *grooves*; in lines 5–6, page 3, the words "extending upward" should be stricken out and the same inserted after the abbreviation and numeral "Fig. 9," in line 4, same page, and in line 81, page 7, the period after the word "short" should be stricken out and a comma inserted instead, and the following word "The" should commence with a small *t* making the sentence continuous; and that the said Letters Patent should be read with these corrections therein that the same may conform to the record of the case in the Patent Office.

Signed, countersigned, and sealed this 3d day of May, A. D. 1892.

[SEAL.]

CYRUS BUSSEY,
*Assistant Secretary of the Interior.*

Countersigned:
   W. E. SIMONDS,
      *Commissioner of Patents.*